United States Patent [19]

Horibe et al.

[11] Patent Number: 4,904,175

[45] Date of Patent: Feb. 27, 1990

[54] MAGNETIC PLASTIC ROTOR DISK MANUFACTURING APPARATUS

[75] Inventors: Kinya Horibe; Masazumi Kawai; Yasukazu Hoshino; Koichiro Tsuji; Kiyofumi Uchida, all of Skizuoka, Japan

[73] Assignee: Yazaki Corporation, Tokyo, Japan

[21] Appl. No.: 342,786

[22] Filed: Apr. 25, 1989

[30] Foreign Application Priority Data

Apr. 28, 1988 [JP] Japan .................................. 63-104166

[51] Int. Cl.$^4$ ..................... B29C 33/00; B29C 39/26; B29C 45/40
[52] U.S. Cl. .................................. 425/174.4; 264/24; 425/174.8 R
[58] Field of Search ............. 425/174, 174.4, 174.8 R; 264/24

[56] References Cited

U.S. PATENT DOCUMENTS

| | | | |
|---|---|---|---|
| 2,999,271 | 9/1961 | Falk et al. | 264/24 |
| 3,555,621 | 1/1971 | Hara | 264/24 |
| 3,842,148 | 10/1974 | Loubier | 264/24 |
| 4,333,895 | 6/1982 | Strawson et al. | 264/24 |
| 4,678,616 | 7/1987 | Kawashima | 264/24 |

*Primary Examiner*—Willard Hoag
*Attorney, Agent, or Firm*—Armstrong, Nikaido, Marmelstein, Kubovcik & Murray

[57] ABSTRACT

A magnetic plastic rotor disk manufacturing apparatus according to the present invention is capable of manufacturing a plurality of magnetic plastic rotor disks having equal desired surface magnetic flux density distribution characteristics in a single molding cycle.

The apparatus comprises a metal mold composed of a pair of half molds and having a plurality of cavities for receiving magnetic plastic material therein, etiher one or a plurality of magnetic field creating coils for creating one or a plurality of magnetic fields to magnetize and orient the magnetic particles in the above magnetic plastic material injected into the cavities, and also a plurality of yokes, one of which by any means extends from the central portion thereof along the splitting surface of the metal mold toward the above cavities formed on a circle concentrically formed therein so as to guide the magnetic fluxes of the magnetic fields created by the above coils to flow radially from the central portion of the same toward the periphery thereof. Thus, the magnetic plastic rotor disks formed in the cavities are exposed uniformly and diametrically to the magnetic flux, enabling them having a satisfactorily large surface magnetic flux density.

5 Claims, 7 Drawing Sheets

MAGNETIC PLASTIC ROTOR DISK MANUFACTURING APPARATUS

BACKGROUND OF THE INVENTION

1. Field of the Invention

The present invention relates to a magnetic plastic rotor disk manufacturing apparatus for production of flattened columnar magnetic plastic rotor disks suitably used for measuring instruments.

2. Description of the Prior Art

Figure 8:
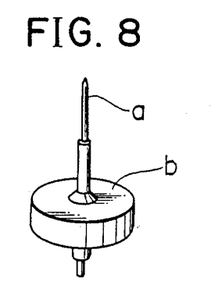
FIG. 8 is a perspective view of a magnetic plastic rotor disk to be manufactured by the magnetic plastic rotor disk manufacturing apparatus of the present invention.
Figure 9:
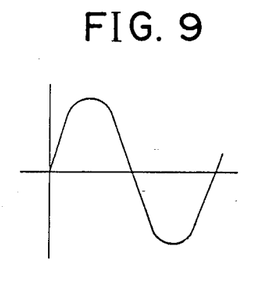
FIG. 9 is a waveform diagram showing ideal surface magnetic flux density distribution characteristics of the magnetic plastic rotor disk of FIG. 8.

A magnetic plastic rotor disk b mounted on a rotor shaft a and having diametrically opposite N and S poles as shown in FIG. 8 has been used for measuring instruments for vehicles to detect or indicate the running speed of a vehicle and rotational frequency of the engine thereof. Magnetic flux density distribution on an outer circumferential surface of the magnetic plastic rotor disk b is required to vary sinusoidally in respect to the rotary angle thereof as shown in FIG. 9.

Figure 10:
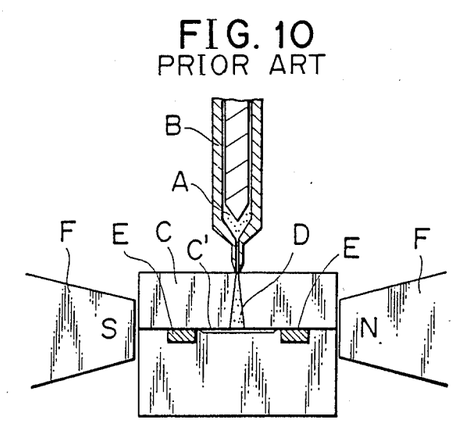
FIG. 10 is a sectional view of a conventional magnetic plastic rotor disk manufacturing apparatus.
Figure 11:
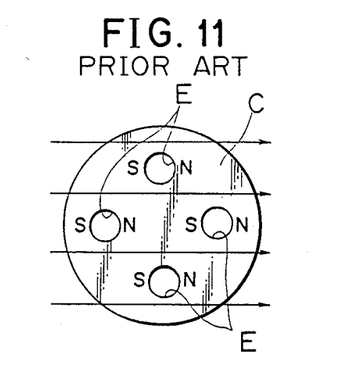
FIG. 11 is a fragmentary plan view of the magnetic plastic rotor disk manufacturing apparatus of FIG. 10.

FIG. 10 shows a conventional magnetic plastic rotor disk manufacturing apparatus for manufacturing such a magnetic plastic rotor disk. In this magnetic plastic rotor disk manufacturing apparatus, a magnetic plastic material A containing a plastic as matrix is injected from an injection device B into a plurality of cavities E provided in a two-plate side gate type mold C through a sprue runner D. A yoke F provided with a coil, not shown, for creating a necessary magnetic field is disposed on a line extended from the plane parting surface C' of the mold C so as to receive the mold C therein to magnetize the magnetic powder contained in the magnetic plastic material A injected into the cavities E by applying the magnetic field thereto, so that the particles of the magnetic powder are magnetized in the same magnetic orientation.

Since this conventional magnetic plastic rotor disk manufacturing apparatus applies the magnetic field to the mold C so that the flux lines extend from one side to the other side of the same, there have been various problems cropped up such as; the cavities E facing the parting surface C' are not exposed uniformly to the magnetic field, the magnetic field is unable to act in the diametrical direction on all the cavities E due to magnetic interference between the cavities E, and thus the magnetic plastic rotor disk having the aforesaid desired surface magnetic flux density distribution characteristics cannot be obtained, whereby the magnetic plastic rotor disks are distorted or the zero-cross position of the magnetic plastic rotor disks is dislocated, and consequently the yield of the conventional magnetic plastic rotor disk manufacturing apparatus results unsatisfactory.

Furthermore, since the magnetic plastic rotor disk manufacturing apparatus needs a magnetic field creating device disposed in a limited space around the mold, the magnetic plastic rotor disk manufacturing apparatus is unable to employ a large magnetic field creating device having a large capacity of creating an intense magnetic field. Thus, the magnetic plastic rotor disk manufacturing apparatus is unable to manufacture magnetic plastic rotor disks having a high surface magnetic flux density. Still further, the disposition of the magnetic field creating device in a space around the mold entails difficulty in operating the magnetic plastic rotor disk manufacturing apparatus in combination with automated machines, such as an automatic insert feed machine, a molding extracting machine and a sprue runner removing machine.

SUMMARY OF THE INVENTION

Accordingly, it is a principal object of the present invention to provide a magnetic plastic rotor disk manufacturing apparatus capable of manufacturing a plurality of magnetic plastic rotor disks having equal desired surface magnetic flux density distribution characteristics in a single molding cycle.

It is another object of the present invention to provide a magnetic plastic rotor disk manufacturing apparatus capable of manufacturing magnetic plastic rotor disks having a satisfactorily large surface magnetic flux density.

It is a further object of the present invention to provide a magnetic plastic rotor disk manufacturing apparatus facilitating the introduction of automated machines into the magnetic plastic rotor disk manufacturing process.

In a first aspect of the present invention, a magnetic plastic rotor disk manufacturing apparatus, provided with a metal mold consisting of a pair of half molds and having a plurality of cavities for molding a magnetic plastic material containing a synthetic resin powder as matrix and a magnetic powder into a plurality of disks, formed in the surface of one of the pair of half molds facing the parting surface, comprises; a magnetic field creating coil for generating a magnetic field capable of orienting the particles of the magnetic powder in the same direction and magnetizing the same, a first yoke disposed within the metal mold so as to extend on one side of the metal mold along the center axis of the metal mold perpendicular to the parting surface, and a second yoke disposed within the metal mold so as to extend along the parting surface; being characterized in that the plurality of cavities are formed in the second yoke on a circle concentrically formed with the second yoke, the flux lines of the magnetic field created by the magnetic field creating coil is concentrated in the central portion of the second yoke through the first yoke, and the flux lines are guided radially by the second yoke from the central portion thereof toward the periphery of the same.

In this magnetic plastic rotor disk manufacturing apparatus, the flux lines are concentrated in the central portion of the second yoke through the first yoke and are guided radially outward by the second yoke. Accordingly, the flux lines extend uniformly through the plurality of cavities in a diametrical direction, so that a plurality of magnetic plastic rotor disks having the same desired surface magnetic flux density distribution characteristics can be produced by a single molding cycle.

In a second aspect of the present invention a magnetic plastic rotor disk manufacturing apparatus, provided with a metal mold consisting of a pair of half molds and having a plurality of cavities for molding a magnetic plastic material containing a synthetic resin as matrix and a magnetic powder into a plurality of disks, formed in the surface of one of the pair of half molds facing the parting surface, comprises; two magnetic field creating coils for creating magnetic fields capable of orienting the particles of the magnetic powder in the same direction and magnetizing the same, a first yoke disposed within the metal mold so as to extend on one side of the metal mold along the center axis of the metal mold perpendicular to the parting surface, a second yoke disposed within the metal mold so as to extend along the splitting surface, and a third yoke disposed within the metal mold so as to extend on the other side of the metal mold along the center axis of the metal mold perpendicular to the parting surface, being characterized in that the plurality of cavities are formed in the second yoke on a circle concentrically formed with the second yoke, the flux lines of the magnetic fields created by the two coils are concentrated in the central portion of the second yoke respectively by the first and third yokes, and the flux lines are guided by the second yoke radially from the central portion thereof toward the periphery of the same.

The foregoing magnetic plastic rotor disk manufacturing apparatus may be provided with an external yoke comprising a planar return yoke which extends outwardly of the metal mold substantially in the same plane as the second yoke, and as many rod-shaped auxiliary yokes as the cavities, which are extending from the return yoke in the same direction as that of extension of the first yoke and positioned at the same distance from the center of the second yoke on the extensions of lines connecting the centers of the cavities to the center of the second yoke.

In the magnetic plastic rotor disk manufacturing apparatus in the second aspect of the present invention, the flux lines of the magnetic fields created by the two coils are concentrated in the central portion of the second yoke by the first and third yokes, and are guided radially outward by the second yoke. Accordingly, magnetic flux of a high density can be applied to each cavity, so that magnetic plastic rotor disks having a high surface magnetic flux density can be produced in a single molding cycle. Furthermore, the external yoke further enhances the concentration of the flux lines on the cavities and ensures the diametrical extension of the flux lines through the cavities, so that magnetic plastic rotor disks having desired surface magnetic flux density distribution characteristics can be produced.

In a third aspect of the present invention, a magnetic plastic rotor disk manufacturing apparatus, provided with a metal mold consisting of a pair of half molds and having a plurality of cavities for molding a magnetic plastic material containing a synthetic resin as matrix and a magnetic powder in a plurality of disks, formed in the surface of one of the pair of half molds facing the parting surface, comprises; two magnetic field creating coils, a first yoke disposed within the metal mold so as to extend on one side of the metal mold along the center axis of the metal mold perpendicular to the parting surface, a second yoke disposed within the metal mold so as to extend along the splitting surface, and a fourth yoke disposed within the metal mold so as to extend on the other side of the metal mold in a direction perpendicular to the parting surface from the circumference of the second yoke; being characterized in that the plurality of cavities are formed in an area inwardly of the fourth yoke in the second yoke on a circle concentrically formed with the second yoke, the flux lines of magnetic fields created by the two coils are concentrated in the central portion of the second yoke respectively by the first and fourth yokes and are guided radially by the second yoke from the central portion toward the periphery of the same.

In the magnetic plastic rotor disk manufacturing apparatus according to the present invention described as above the first yoke way comprise an ejector plate, and an auxiliary member provided to fill up a space through which the ejector plate moves, when the metal mold is closed.

Furthermore, according to the present invention, the flux lines of the magnetic field or the magnetic fields are guided by the first yoke, by the first and third yokes, or by the first and fourth yokes into the central portion of the second yoke and are distributed uniformly to the cavities by the second yoke. Accordingly, the magnetic field creating coils may be disposed apart from the vicinity of the parting surface of the metal mold to facilitate installing automated machines around the metal mold, and the magnetic plastic rotor disk manufacturing apparatus is able to employ a large magnetic field creating coils without any spatial restriction.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

The present invention will be described hereinafter with reference to the accompanying drawings, in which like or corresponding parts are denoted by the same reference numerals throughout.

Figure 1:
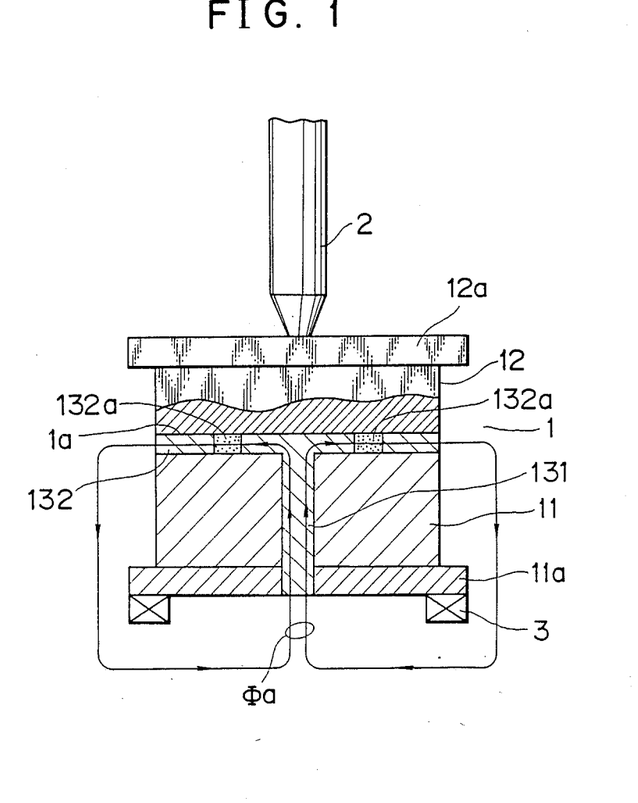
FIG. 1 is partially sectional front view of a magnetic plastic rotor disk manufacturing apparatus in a first embodiment according to the present invention.

FIRST EMBODIMENT (FIG. 1)

Referring to FIG. 1, a metal mold 1 for injection molding can be split along a splitting surface 1a into a lower half mold 11 and an upper half mold 12. A bottom plate 11a and a support plate 12a are attached respectively to the lower half mold 11 and the upper half mold 12 to mount the metal mold 1 on a molding machine. A first yoke 131 is provided in the central portion of the lower half mold 11 so as to extend perpendicularly to the parting surface 1a through the bottom plate 11a. A second yoke 132 is provided on the upper surface of the lower half mold 11 so as to extend in parallel to the parting surface 1a. A plurality of cavities 132a are formed in the second yoke 132 on a circle concentrically formed with the second yoke 132. The plurality of cavities 132a each having predetermined depth for forming an outer circumferential surface and one of the end surfaces of a magnetic plastic rotor disk in a flattened columnar shape to be molded, whereas the lower surface of the upper half mold 12 defines the other end surface of the magnetic plastic rotor disk. The first yoke 131 and the second yoke 132 are formed of a magnetic steel, while the rest of the parts are mainly formed of nonmagnetic steels.

A magnetic plastic material containing a synthetic resin as matrix and a magnetic powder, such as a ferrite powder or a rare earth metal powder, is injected into the cavities 132a of the metal mold 1 by the cylinder head 2 of an injection molding machine.

A toroidal coil 3 for creating a magnetic field is provided coaxially with the first yoke 131 on the lower surface of the bottom plate 11a. The toroidal coil 3 creates a magnetic field represented by flux lines extending perpendicularly to the parting surface 1a through the central portion of the same. The intensity of the magnetic field created by the toroidal coil 3 can be readily controlled by controlling the intensity of current supplied to the toroidal coil 3.

When the metal mold 1 is closed, the magnetic flux $\Phi a$ of the magnetic field created by the toroidal coil 3 flows through the first yoke 131 extending through the central portion of the lower half mold 11 and the second yoke 132 extending along the parting surface 1a as indicated by arrows. Thus, the magnetic flux $\Phi a$ flows radially from the central portion toward the periphery of the second yoke 132. The magnetic flux flows equally along the respective diametrical directions of the plurality of cavities 132a arranged on the circle concentrically formed with the first yoke 131.

When the magnetic plastic material is injected into the cavities 132a of the metal mold 1 by through the cylinder head 2 of the injection device after closing the metal mold 1, the magnetic particles of the magnetic plastic material injected into the cavities 132a are magnetized and oriented in the direction of flow of the magnetic flux $\Phi a$. After the magnetic plastic material injected into the cavities 132a has solidified, the metal mold 1 is split along the parting surface 1a to take out the molded, and diametrically magnetized magnetic plastic rotor disks from the cavities 132a.

Magnetic plastic rotor disks of 12 mm in diameter and 3 mm in thickness manufactured by molding a magnetic plastic material containing a 12-nylon powder as matrix and 89% by weight strontium ferrite as the magnetic powder using the foregoing magnetic plastic rotor disk manufacturing apparatus were evaluated in comparison with magnetic plastic rotor disks of the same size manufactured by molding the same material by a conventional magnetic plastic rotor disk manufacturing apparatus. The results of the comparative evaluation are shown in the following table.

| Properties | Invention | Control |
| --- | --- | --- |
| Amount of flux (KM × Turns) | 86 (88) | 80 |
| Surface magnetic flux density (Gauss) | 1000 (1100) | 900 |
| Waveform | ◎ | ○ |
| Zero-cross position | ◎ | ○ |
| Re-magnetization | Unnecessary | Necessary |
| Productivity | ◎ | x |
| Production cost | ◎ | Δ |

Note:
Values in parentheses are for magnetic plastic rotor disks manufactured by a magnetic plastic rotor disk manufacturing apparatus in a second embodiment according to the present invention which will be described below.

Figure 2:
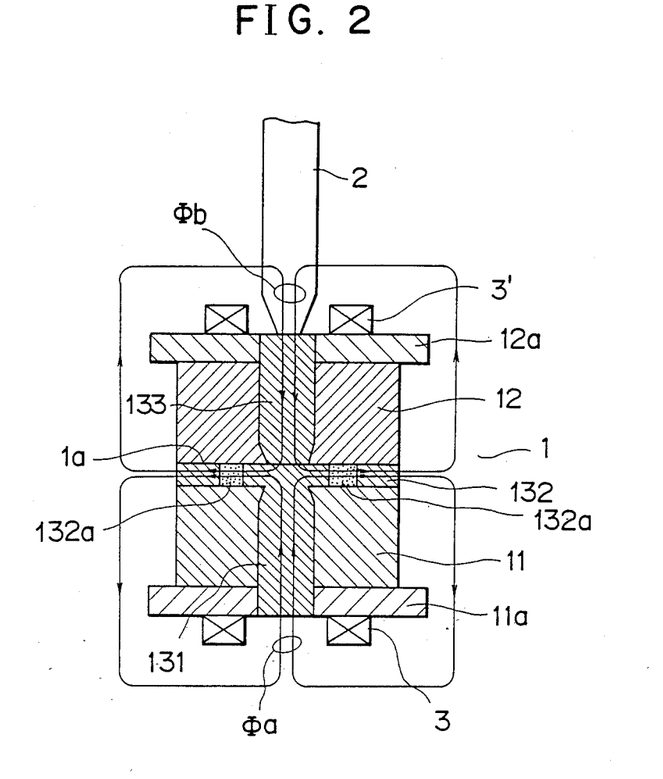
FIG. 2 is a sectional view of a magnetic plastic rotor disk manufacturing apparatus in a second embodiment according to the present invention.

SECOND EMBODIMENT (FIG. 2)

A magnetic plastic rotor disk manufacturing apparatus in a second embodiment according to the present invention is similar in construction to that in the first embodiment, except that the magnetic plastic rotor disk manufacturing apparatus in the second embodiment is provided additionally with a third yoke 133 and a toroidal coil 3' for creating a magnetic field. The third yoke 133 is provided in the central portion of the upper half mold 12 of a metal mold 1 so as to extend perpendicularly to the splitting surface 1a of the metal mold 1 through a support plate 12a attached to the upper surface of the upper half mold 12. The toroidal coil 3' is disposed on top of the support plate 12a coaxially with the third yoke 133. The magnetic flux of a magnetic field created by the toroidal coil 3' flows perpendicularly to the splitting surface 1a through the third yoke 133. The intensity of the magnetic field created by the toroidal coil 3' can be controlled, similarly to that created by a toroidal coil 3 provided on the lower surface of a bottom plate 11a attached to the bottom surface of the lower half mold 11 of the metal mold 1, by controlling the intensity of current supplied to the toroidal coil 3'.

When the toroidal coil 3' is energized with the metal mold closed, the magnetic flux $\Phi b$ of the magnetic field created by the toroidal coil 3' flows through the third yoke 133 and a second yoke 132 extending along the parting surface 1a as indicated by arrows. The respective magnetic fluxes $\Phi a$ and $\Phi b$ of the magnetic fields created by the toroidal coils 3 and 3' repulse each other in a region in the second yoke 132 where the magnetic fluxes $\Phi a$ and $\Phi b$ encounter each other and flow in radial directions diametrically across cavities 132a formed in the second yoke 132 on a circle concentrically formed with the second yoke 132. Accordingly, the magnetic plastic rotor disks manufactured by the magnetic plastic rotor disk manufacturing apparatus in the second embodiment have an amount of flux and a surface magnetic flux density indicated by values in the parentheses in the table shown above, which are greater than those of the magnetic plastic rotor disks manufactured by the magnetic plastic rotor disk manufacturing apparatus in the first embodiment. The magnetic plastic rotor disks can be magnetized diametrically along both the end surfaces of each disk due to the opposite magnetic fields which are repulsing each other.

Figure 3:
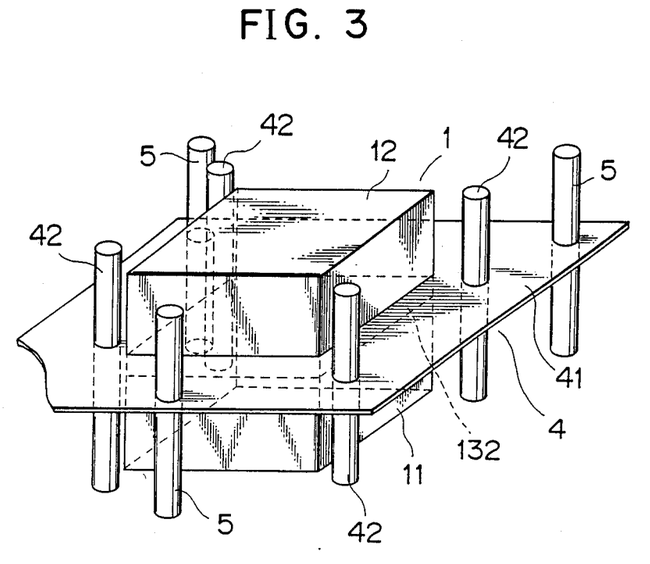
FIG. 3 is a perspective view of an external yoke applicable to the magnetic plastic rotor disk manufacturing apparatus of FIGS. 1 and 2.
Figure 4:
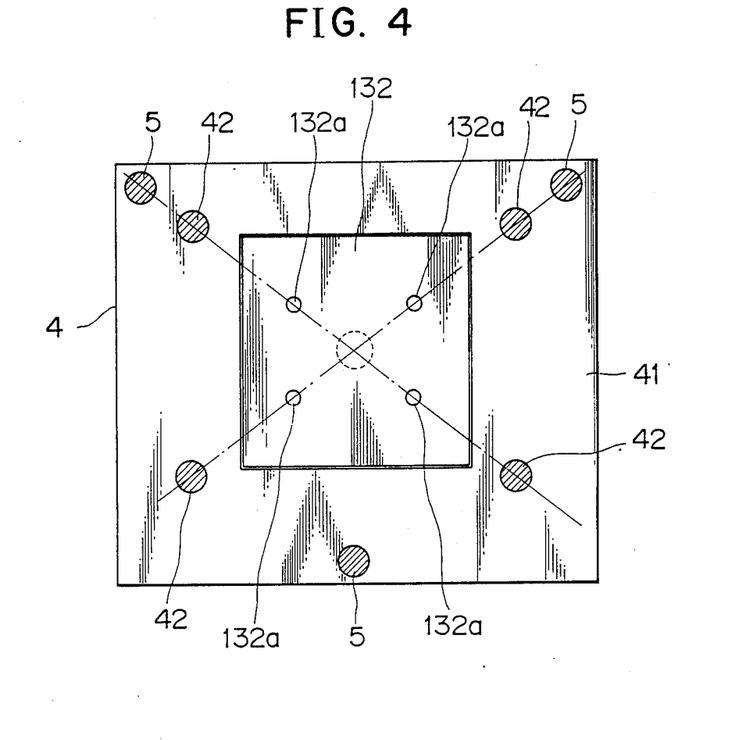
FIG. 4 is a sectional view of the external yoke of FIG. 3.

An external yoke 4 as shown in FIGS. 3 and 4 is advantageously applicable to the magnetic plastic rotor disk manufacturing apparatus in the first and second embodiments shown in FIGS. 1 and 2, respectively.

Referring to FIGS. 3 and 4, the external yoke 4 consists of a return yoke 41 formed of a magnetic steel, and a rod-shaped auxiliary yokes 42 formed of a magnetic steel. The return yoke 41 extends outwardly of the metal mold 1 substantially in the same plane as the second yoke 132. The auxiliary yokes 42 extends from the return yoke 41 in the direction of extension of the first yoke 131. The number (in this embodiment, four) of the auxiliary yokes 42 is the same as that of the cavities 132a. The auxiliary yokes 42 are arranged on a circle concentrically formed with the second yoke 132 respectively at intersections of the circle and the radii of the circle passing the centers of the cavities 132a. In FIGS. 3 and 4, indicated at 5 are tie bars of the injection molding machine, for supporting and guiding the upper half mold 12 in opening and closing the metal mold 1 on the injection molding machine.

The magnetic flux radially flowing through the second yoke 132 from the central portion toward the periphery of the same flows further through the return yoke 41 and is concentrated in the auxiliary yokes 42, so that the magnetic flux flows equally and collectively in the respective diametrical directions of the cavities 132a formed in the second yoke 132 on lines connecting the center of the second yoke 132 and the centers of the auxiliary yokes 42, respectively.

Figure 5:
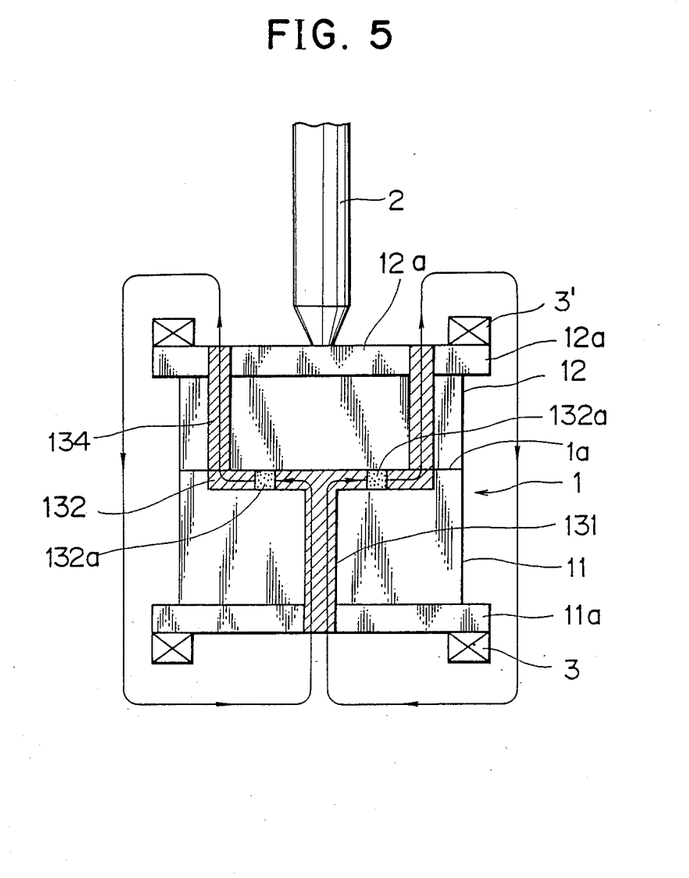
FIG. 5 is a sectional view of a magnetic plastic rotor disk manufacturing apparatus in a third embodiment according to the present invention.

THIRD EMBODIMENT (FIG. 5)

Referring to FIG. 5, a magnetic plastic rotor disk manufacturing apparatus in a third embodiment according to the present invention comprises a metallic mold 1 consisting of a lower half mold 11 and an upper half mold 12, a bottom plate 11a attached to the bottom surface of the lower half mold 11, a support plate attached to the upper surface of the upper half mold 12, a toroidal coil 3 provided on the lower surface of the bottom plate 11a, a toroidal coil 3' provided on the upper surface of the support plate 12a, a first yoke 131 provided in the central portion of the lower half mold 11 so as to extend along the center axis of the lower half mold 11, a second yoke 132 provided on the lower half mold 11 so as to extend in parallel to the parting surface 1a of the metal mold 1 and provided with a plurality of cavities 132a arranged on a circle concentrically formed with the second yoke 132, and a fourth yoke 134 provided in the upper half mold 12 so as to stand upright from the periphery of the second yoke 132 to the support plate 12a.

The respective magnetic fluxes of magnetic fields created by the toroidal coils 3 and 3' flow along a magnetic path extending through the first yoke 131 and the second yoke 132 as indicated by arrows. Accordingly, this magnetic plastic rotor disk manufacturing apparatus does not need the return yoke 41 shown in FIG. 3 and 4.

Figure 6:
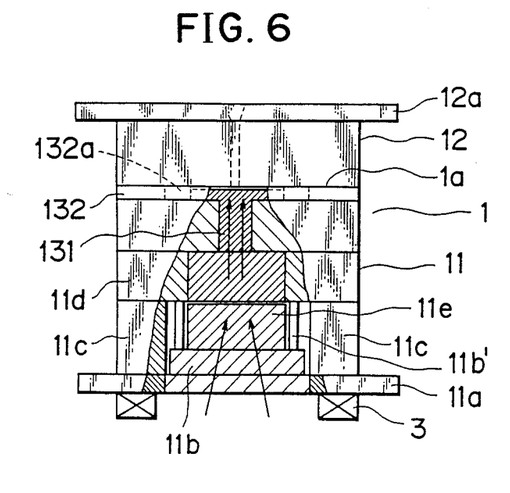
FIGS. 6 and 7 are sectional view of an ejector plate mechanism desirably applied to the magnetic plastic rotor disk manufacturing apparatus in the first, second and third embodiments.
Figure 7:
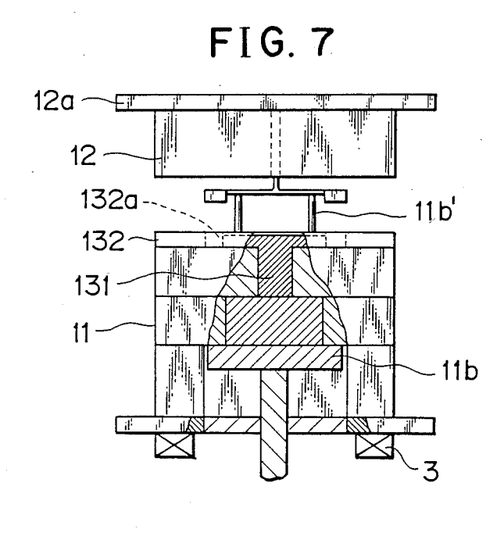

MODIFICATION (FIGS. 6 and 7)

In a modification of the magnetic plastic rotor disk manufacturing apparatus shown in FIGS. 1 to 5, an ejector plate 11b is provided in the lower half mold 11 of the metal mold 1. The lower half mold 11 includes a base plate 11d fixed to two spacer blocks 11c which are further fixed to the bottom plate 11a. The spacer blocks 11c and the base plate 11d define a space in which the ejector plate 11b moves. The ejector plate 11b is retracted from the operating position when the metal mold 1 is closed. The respective central portions of the ejector plate 11b and the base plate 11d are formed of a magnetic steel. The respective magnetic central portions of the ejector plate 11b and the base plate 11d compare a first yoke 131 together with an auxiliary member 11e which is inserted automatically in a space formed between the ejector plate 11b and the base plate 11d when the ejector plate 11b is retracted by a mechanism, not shown, form a first yoke 131. When the metal mold 1 is in the open state, the auxiliary member 11e is removed from the space to allow the ejector plate 11b to move in the space. The ejector plate 11b is moved toward the lower half mold 11 to eject magnetic plastic rotor disks from the cavities 132a with ejector pins 11b' attached to the ejector plate 11b.

Although nothing has been mentioned in the foregoing description about the rotor shaft of the magnetic plastic rotor, it is obvious that the rotor shaft can be combined with the magnetic plastic rotor disk by insert molding in molding the magnetic plastic rotor disk.

As is apparent from the foregoing description, the present invention has the following advantages.

The coil for creating a magnetic field need not be provided near the splitting surface of the metal mold because of the magnetic flux of a magnetic field created by the coil (3 or 3') is guided by the first yoke (131) provided in the lower half mold (11), the third yoke (133) provided in the upper half mold (12) or the fourth yoke (134) provided in the upper half mold (12) to the second yoke (132) provided on the lower half mold (11) so as to extend in parallel to the parting surface (1a) of the metal mold (1) and provided with cavities (132a), and the magnetic flux flows radially through the second yoke (132) from the central portion toward the periphery of the same to magnetize and orient magnetic particles contained in a magnetic plastic material injected into the cavities. Accordingly, the magnetic plastic rotor disk manufacturing apparatus of the present invention can easily be used in combination with automated machines, and a plurality of diametrically magnetized magnetic plastic rotor disks having a large amount of flux and a high surface magnetic flux density can be manufactured in a single molding cycle without significant difference in surface magnetic flux density distribution characteristics therebetween. Thus, the magnetic plastic rotor disk manufacturing apparatus of the present invention has a high productivity and is capable of manufacturing magnetic plastic rotor disks at a reduced cost.

The use of the two coils (3 and 3') for creating magnetic fields enables the production of magnetic plastic rotor disks having an increased amount of flux and an increased surface magnetic flux density.

The auxiliary yokes (42) of the external yoke (4) positioned on the extensions of lines connecting the center of the second yoke (132) and the respective centers of the cavities (132a) formed in the horizontal yoke (132) cause the flux lines extend collectively and diametrically through the cavities (132a), which provides magnetic plastic rotor disks molded in the cavities (132a) with satisfactory surface magnetic flux density distribution characteristics.

The use of portions of the ejector plate (11b) and the auxiliary member (11e) as part of the first yoke (131) simplifies the construction of the first yoke (131) and enhances the efficiency of the magnetic flux.

Although the invention has been described in its preferred forms with a certain degree of particularity, the description is illustrative and is not to be construed as limiting the scope of the invention. It is therefore to be understood that various modifications and changes may occur to those skilled in the art without departing from the scope and spirit thereof.

What is claimed is:

1. A magnetic plastic rotor disk manufacturing apparatus for manufacturing diametrically magnetized magnetic plastic rotor disks comprising;

a metal mold comprising a pair of half molds for molding a magnetic plastic material containing synthetic resin matrix and magnetic powder into a plurality of disks, and having a plurality of cavities along the splitting surface thereof;

a magnetic field creating coil for creating and applying the magnetic field along said parting surface of said metal mold to magnetize and orient the magnetic particles of said magnetic powder injected into said plurality of cavities;

a first yoke provided in the central portion of said metal mold so as to extend on one side thereof perpendicularly to said parting surface; and a second yoke provided in the metal mold so as to extend along said parting surface;

said plurality of cavities being formed on a circle concentrically formed with said second yoke; so that the magnetic flux of said magnetic field created by said magnetic field creating coil is concentrated in the central portion of said second yoke by way of said first yoke, and is guided radially by said second yoke from the central portion toward the periphery thereof.

2. A magnetic plastic rotor disk manufacturing apparatus for manufacturing diametrically magnetized magnetic plastic rotor disks comprising;

a metal mold comprising a pair of half molds for molding a magnetic plastic material containing synthetic resin matrix and magnetic powder into a plurality of disks, and having a plurality of cavities along the parting surface thereof;

two magnetic field creating coils for creating and applying the magnetic fields along said parting surface of said metal mold to magnetize and orient the magnetic particles of said magnetic powder injected into said plurality of cavities;

a first yoke provided in the central portion of said metal mold so as to extend on one side thereof perpendicularly to said parting surface; and a second yoke provided in the metal mold so as to extend along said parting surface; and a third yoke provided in the central portion of said metal mold so as to extend on the other side thereof perpendicularly to said parting surface;

said plurality of cavities being formed on a circle concentrically formed with said second yoke; so that the respective magnetic fluxes of said magnetic fields created by said two magnetic field creating coils are concentrated in the central portion of said second yoke by way of said first and third yokes, respectively, and are guided radially by said second yoke from the central portion toward the periphery thereof.

3. A magnetic plastic rotor disk manufacturing apparatus according to claim 1 or 2, further comprising an external yoke consisting of a return yoke extending outwardly of said metal mold in substantially same plane as said second yoke when said metal mold is closed, and also of as many rod-shaped auxiliary yokes as said cavities, which are extending in the same direction as that of extended line of said first yoke from said return yoke;

said auxiliary yokes being disposed at the same distance from the center of said second yoke on the extensions of lines connecting said cavities to the center of said second yoke, respectively.

4. A magnetic plastic rotor disk manufacturing apparatus for manufacturing diametrically magnetized magnetic plastic rotor disks, comprising;

a metal mold comprising a pair of half molds for molding a magnetic plastic material containing synthetic resin matrix and magnetic powder into a plurality of disks, and having a plurality of cavities along the parting surface thereof;

two magnetic field creating coils for creating and applying the magnetic fields along said parting surface of said metal mold to magnetize and orient the magnetic particles of said magnetic powder injected into said plurality of cavities;

a first yoke provided in the central portion of said metal mold so as to extend on one side thereof perpendicularly to said parting surface;

a second yoke provided in the metal mold so as to extend along said parting surface; and a fourth yoke provided in the peripheral portion of said metal mold so as to extend on the other side thereof perpendicularly to said splitting surface;

said plurality of cavities being formed in said second yoke in an area inwardly of said fourth yoke on a circle concentrically formed with said second yoke; so that the respective magnetic fluxes of said magnetic fields created by said two magnetic field creating coils are guided by said first, second and fourth yokes and so that said magnetic fluxes are concentrated in the central portion of said second yoke and flow radially from the central portion toward the periphery thereof.

5. A magnetic plastic rotor disk manufacturing apparatus according to claim 1 or 4, wherein said first yoke comprises an ejector plate, and an auxiliary member provided to fill up a space in which said ejector plate moves, when said metal mold is closed.

* * * * *